Nov. 2, 1943.　　　J. E. WOODS　　　2,333,401
BELLOWS CONTROL UNIT
Filed Dec. 31, 1941
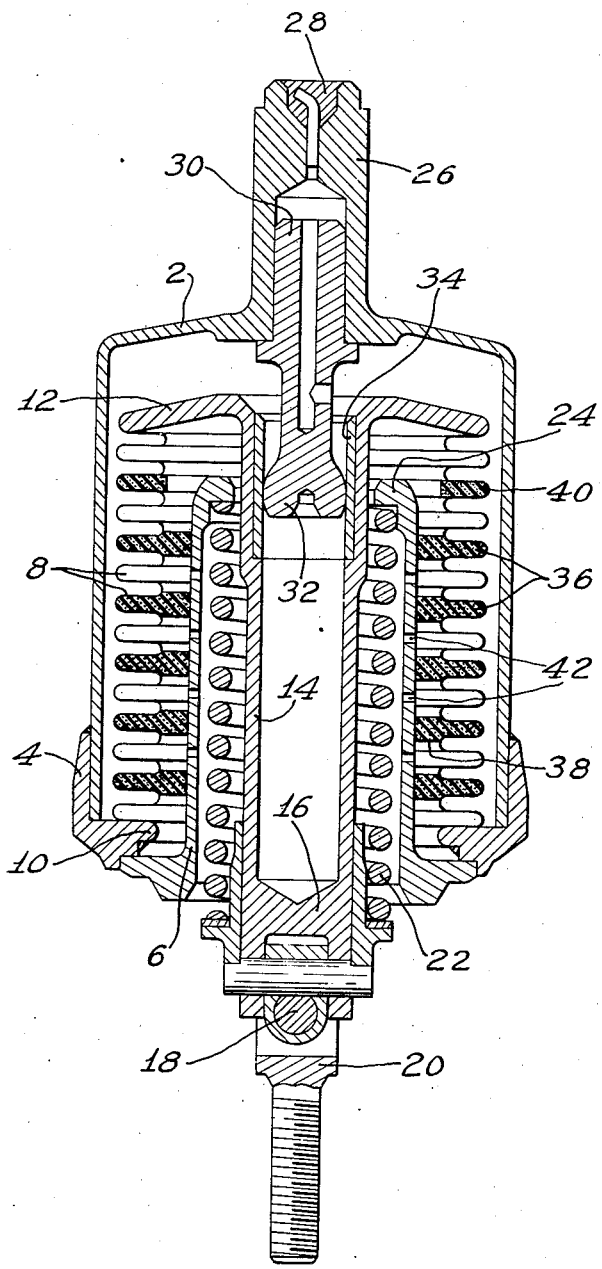
Witness
Charles J. Olson
Inventor
John E. Woods
by his attorneys
Fish Hildreth Cary & Jenney Patented Nov. 2, 1943

2,333,401

UNITED STATES PATENT OFFICE 2,333,401

BELLOWS CONTROL UNIT

John E. Woods, Brookline, Mass., assignor to Clifford Manufacturing Co., Boston, Mass., a corporation of Delaware Application December 31, 1941, Serial No. 425,249

5 Claims. (Cl. 137—156.5)

The present invention relates to bellows control units, and more particularly to devices which are subjected to intense vibration.

One important example of a bellows unit which is subjected to vibration is the so-called aneroid control for varying the supply of air to the carburetor of an aircraft motor. This control embodies a bellows which expands or contracts in accordance with the atmospheric pressure. Owing to the proximity of the bellows to the motor, the bellows is subjected to severe vibrations, and in many cases has been found to fail within a few hours.

The principal object of the present invention is to provide means for preventing dangerous vibrations without affecting the ability of the bellows to respond to changes in pressure. With this object in view, the invention contemplates the use of rubber or rubber-like loading rings fitting within certain of the bellows folds and arranged to contact with the wall of the bellows enclosure. In the preferred form of the invention, the loading rings consist of sponge rubber or neoprene, which have been found to operate most satisfactorily.

The accompanying drawing is a sectional elevation of the preferred form of bellows unit according to the present invention.

The illustrated embodiment of the invention comprises an outer cup 2 soldered at its lower end to a flanged sleeve member 4, which in turn is connected with an internal sleeve member 6. A metallic bellows 8, having a considerable number of convolutions, is secured at one end to a lip 10 of the member 4, and is secured at its other end to a movable head 12. The head is formed with an integral sleeve 14, closed at the bottom, as indicated at 16. A swivel joint 18 connects with a link 20, leading to any suitable device which is to be controlled in accordance with the atmospheric pressure. A spring 22 surrounds the sleeve 14 and bears at its upper end against a flange 24 on the upper end of the sleeve 6.

The cup 2 is formed with a projecting stem 26, having a central bore by which the space between the bellows and the cup 2 may be evacuated. After evacuation the bore is sealed as indicated at 28. A positioning member 30, contained within the stem 26, has a knob 32 at its lower end to engage with a bushing 34 within the upper end of the sleeve 14 to retain the assembly against excessive lateral movement.

Received in a number of folds between convolutions is a series of flexible loading rings 36. As indicated in the drawing, a ring is supplied at approximately every third fold. The rings are well seated in the folds and are compressed thereby. Within the space between the folds and the sleeve member 6 the rings expand slightly, as indicated at 38. The inner peripheries of the rings bear against the outer wall of the sleeve 6 sufficiently to impart some frictional resistance to rapid movement. At the top, there are provided one or more rings 40 with larger central openings to clear the sleeve 6.

The sleeve 6 is provided with vent openings 42 between rings to equalize the pressure within the bellows. The rings 36 may be of sponge-rubber-like material, preferably sponge neoprene. Neoprene is preferred to natural rubber, because of its resistance to heat and its better aging characteristics, but it is to be understood that any rubber-like material may be employed.

In use as an aneroid control, the stem 26 is connected through suitable linkage to devices for controlling the air supplied to the carburetor. The space between the cup 2 and the bellows is evacuated to a definite pressure. As the airplane changes altitude and the atmospheric pressure varies, the bellows contracts or expands and thus changes the air adjustment.

The vibrations of the motor are transmitted to the casing, and if the rings 36 were omitted, the material of the bellows would likewise be subjected to severe vibration. It is well known that bellows units are susceptible to failure under sustained vibrations, since the metal has been work-hardened to a considerable degree in manufacture, and the excessive flexures due to vibration rapidly increase the work-hardening to the point of brittleness, whereupon a failure is almost certain to ensue.

The loading members 36 and 40 prevent the occurrence of dangerous vibrations in the bellows. This action is due in part to a damping effect, that is, an actual dissipation of energy, and in part to a loading effect which changes the natural frequencies of vibration of the bellows. As for the dissipation of energy, that is caused to some extent by the frictional engagement of the rings with the walls, but mainly by the internal friction in the rings themselves. It will be understood that sponge rubber material is particularly suitable because it does not materially interfere with normal expansion or contraction of the bellows upon change of altitude, but does effectively damp the extremely rapid movements caused by vibration.

An ordinary bellows may be viewed as a number of vibrating members, since each convolution is capable of vibration apart from the others. Hence, a bellows with a large number of convolutions has a large number of degrees of freedom. There is no single natural frequency to which the bellows will respond; actually the bellows will sustain vibrations at substantially any frequency, that is, at substantially any motor speed. In some modes of vibration, the disturbance travels as a wave from one fold to the next.

By the use of the loading members 36 and 40, the bellows is divided into a number of sections, all isolated from one another, so far as vibration effects are concerned. The independent sections, each consisting of only a few folds, have natural frequencies higher than the vibration frequencies usually encountered. These sections are separated by loaded convolutions, which have a relatively low natural frequency. Accordingly, resonant vibrations may not even be started anywhere in the unit. But if any such vibrations are started in any section, they are effectively isolated in that section and cannot pass the loaded portions. The vibration effects, if they occur at all, dissipate rapidly. Consequently, the unit according to the present invention has a longer life and is capable of more reliable operation than the conventional equipment.

In some instances, cell-tight neoprene may be preferred for the loading members. Cell-tight neoprene has completely closed cells filled with nitrogen gas. As the altitude increases, the entrapped nitrogen expands, thereby increasing the damping effect. This type will therefore be useful when the vibration effects are found to increase with altitude. Some of the outer cells may lose gas at the higher altitudes, but the gas is restored thereto when the plane returns to the lower altitudes, and without disturbing the calibration of the device.

Having thus described my invention, I claim:

1. A bellows control unit comprising a bellows, a fixed sleeve member having a wall opposed to the bellows and spaced therefrom, and separate loading rings of compressible material fitting in several of the folds of the bellows and bearing against the sleeve member to prevent the occurrence of sustained vibrations in the bellows while permitting free response thereof substantially in accordance with the characteristics of the bellows.

2. A bellows control unit comprising a bellows, a fixed sleeve member having a wall opposed to the bellows and spaced therefrom, and separate loading rings of sponge rubber-like material fitting in several of the folds of the bellows and bearing against the sleeve member to prevent the occurrence of sustained vibrations in the bellows while permitting free response thereof substantially in accordance with the characteristics of the bellows.

3. A bellows control unit comprising a bellows, a fixed sleeve member having a wall opposed to the bellows and spaced therefrom, and separate loading rings of cell-tight sponge rubber-like material fitting in several of the folds of the bellows and bearing against the sleeve member to prevent the occurrence of sustained vibrations in the bellows while permitting free response thereof substantially in accordance with the characteristics of the bellows.

4. A bellows control unit comprising a bellows, a fixed sleeve member having a wall opposed to the bellows and spaced therefrom, and separate loading rings of sponge neoprene fitting in several of the folds of the bellows and bearing against the sleeve member to prevent the occurrence of sustained vibrations in the bellows while permitting free response thereof substantially in accordance with the characteristics of the bellows.

5. A bellows control unit comprising a bellows, a fixed sleeve member having a wall opposed to the bellows and spaced therefrom, and separate loading rings of cell-tight sponge neoprene fitting in several of the folds of the bellows and bearing against the sleeve member to prevent occurrence of sustained vibrations in the bellows while permitting free response thereof substantially in accordance with the characteristics of the bellows.

JOHN E. WOODS.